(12) United States Patent
Jenkins

(10) Patent No.: US 12,364,963 B2
(45) Date of Patent: Jul. 22, 2025

(54) PROCESS FOR THE PRODUCTION OF ALKOXYLATES

(71) Applicants: thyssenkrupp Industrial Solutions AG, Essen (DE); thyssenkrupp AG, Essen (DE)

(72) Inventor: Christopher Jenkins, Caulfield South (AU)

(73) Assignees: thyssenkrupp Uhde GmbH, Dortmund (DE); thyssenkrupp AG, Essen (DE)

(*) Notice: Subject to any disclaimer, the term of this patent is extended or adjusted under 35 U.S.C. 154(b) by 718 days.

(21) Appl. No.: 17/627,425

(22) PCT Filed: Jul. 16, 2020

(86) PCT No.: PCT/EP2020/070083
§ 371 (c)(1),
(2) Date: Jan. 14, 2022

(87) PCT Pub. No.: WO2021/009269
PCT Pub. Date: Jan. 21, 2021

(65) Prior Publication Data
US 2022/0258121 A1    Aug. 18, 2022

(30) Foreign Application Priority Data
Jul. 16, 2019 (EP) .................... 19186525

(51) Int. Cl.
*C08G 65/08* (2006.01)
*B01J 19/24* (2006.01)
(Continued)

(52) U.S. Cl.
CPC ....... *B01J 19/2435* (2013.01); *B01J 19/2465* (2013.01); *C08G 65/04* (2013.01);
(Continued)

(58) Field of Classification Search
CPC ........ C08G 65/04; C08G 65/06; C08G 65/08; C08G 65/26; C08G 65/2606;
(Continued)

(56) References Cited

U.S. PATENT DOCUMENTS 5,159,092 A * 10/1992 Leuteritz ................. C07C 41/03
562/557
5,684,097 A    11/1997 Palmroos et al.
(Continued)

FOREIGN PATENT DOCUMENTS

CN    104292451 A  †  1/2015
CN    104725170 A     6/2015
(Continued)

OTHER PUBLICATIONS

Ionescu, Mihail, "Chemistry and Technology of Polyols for Polyurethanes", 2nd Ed. vol. 1, Smithers Rapra, UK 2016, p. 128-134. (Year: 2016).*
(Continued)

*Primary Examiner* — Rip A Lee
(74) *Attorney, Agent, or Firm* — thyssenkrupp North America, LLC

(57) ABSTRACT

A process for producing alkoxylates features a high growth ratio without the need of interim storage of a pre-polymer produced in a first reactor. The process may involve reacting a monomeric educt in the presence of a catalyst and a starting material in a first reactor equipped with a first circulation loop and thereafter passing a pre-polymer that is produced of the first circulation loop to a second reactor equipped with a second circulation loop, where a desired polymer is produced. The first reactor may comprise a smaller volume than the second reactor. The growth ratio,
(Continued)

defined as a final batch volume of the second reactor divided by a minimum initial volume of the starting material in the first reactor, is at least 80:1.

19 Claims, 2 Drawing Sheets

(51) Int. Cl.
  *C08G 65/04* (2006.01)
  *C08G 65/26* (2006.01)
(52) U.S. Cl.
  CPC ......... *C08G 65/08* (2013.01); *C08G 65/2609* (2013.01); *B01J 2219/00087* (2013.01); *B01J 2219/00103* (2013.01); *C08G 2650/36* (2013.01); *C08G 2650/58* (2013.01)
(58) Field of Classification Search
  CPC ................ C08G 65/2609; C08G 65/46; C08G 2650/58; C08G 2650/36
  See application file for complete search history.

(56) References Cited

U.S. PATENT DOCUMENTS

| | | | |
|---|---|---|---|
| 5,811,595 A | 9/1998 | Ellis | |
| 6,673,972 B2 * | 1/2004 | Ostrowski | C08G 65/2696 422/198 |
| 7,083,773 B2 † | 8/2006 | Kwon | |
| 7,186,867 B2 * | 3/2007 | Ostrowski | C08G 65/2696 568/679 |
| 7,528,288 B2 * | 5/2009 | Ostrowski | C08G 65/2663 568/621 |
| 7,723,465 B2 * | 5/2010 | Herwig | C08G 65/2663 568/679 |
| 7,750,191 B2 * | 7/2010 | Ostrowski | C08G 18/4866 568/619 |
| 8,058,388 B2 * | 11/2011 | Sellmann | C08G 65/2696 568/624 |
| 8,389,774 B2 * | 3/2013 | Becker | B01J 4/002 422/600 |
| 8,841,389 B2 * | 9/2014 | Kutschera | C08F 2/22 526/918 |
| 9,068,044 B2 | 6/2015 | Schubert et al. | |
| 9,074,044 B2 * | 7/2015 | Weston | C08G 65/2663 |
| 9,695,098 B2 | 7/2017 | Miller et al. | |
| 2006/0205984 A1 * | 9/2006 | Klass | C07C 41/08 568/688 |
| 2009/0292084 A1 † | 11/2009 | Sellmann | |
| 2010/0261870 A1 * | 10/2010 | Loeffler | C08G 65/2696 528/425 |
| 2011/0105802 A1 * | 5/2011 | Villa | C08G 65/2696 568/679 |
| 2011/0218322 A1 | 9/2011 | Nakamoto et al. | |
| 2012/0283483 A1 | 11/2012 | Weston et al. | |
| 2013/0030074 A1 * | 1/2013 | Chilekar | C08G 18/5021 568/679 |
| 2014/0142271 A1 * | 5/2014 | Almena Munoz | C08G 65/2663 568/623 |
| 2016/0208080 A1 | 7/2016 | Laemmerhold et al. | |
| 2020/0255554 A1 | 8/2020 | Banat | |

FOREIGN PATENT DOCUMENTS

| | | | | |
|---|---|---|---|---|
| CN | 106543429 A * | 3/2017 | ......... | C08G 65/2609 |
| CN | 109438199 A | 3/2019 | | |
| EP | 2 285 867 | 2/2011 | | |
| EP | 2 513 192 A1 | 10/2012 | | |
| EP | 2 543 689 A1 | 1/2013 | | |
| EP | 2513192 B1 † | 1/2014 | | |
| EP | 2285867 B1 † | 2/2016 | | |
| EP | 2543689 B1 † | 8/2016 | | |
| EP | 3 135 694 A1 | 3/2017 | | |
| RU | 2668974 C2 | 9/2017 | | |
| WO | WO-2005047365 A1 * | 5/2005 | ............. | C07C 43/00 |
| WO | WO-2009077517 A1 * | 6/2009 | ........ | C08G 65/2609 |
| WO | WO-2012116870 A1 * | 9/2012 | .......... | B01J 19/0066 |

OTHER PUBLICATIONS

Goethals, Eric J., Ed. "Telechelic Polymers: Synthesis and Applications", CRC Press 1989, p. 197, 198, 203. (Year: 1989).*
English Translation of International Search Report issued in PCT/EP2020/070083, dated Oct. 15, 2020.
European Search Report Issued in 19186525.2 dated Nov. 7, 2019.
Ionescu, Mihail, Chemistry and Technology of Polyols for Polyurethanes, IBAN 978-1-84735-035 (2005).
Ullmann's Encyclopedia of Industrial Chemistry, 5th edition, vol. B4, p. 172-173, Weinheim, Germany (1992).
Buss Chemtech brochure to participants at the Graz Ethylene Oxide Converter Conference of Jun. 29, 2006.
H. Warmeling, et al., "Jet loop reactors as a versatile reactor setup—Intensifying catalytic reactions: A review", Chemical Engineering Science, 149: 229-248 (2006).
Zoller et al., Handbook of Detergents, Part F: Production, Surfactant Science Series, vol. 142, CRC Press (2008).
Ionescu, Mihail, Chemistry and Technology of Polyols for Polyurethanes, Rapra Technology Limited, ISBN 978-1-84735-035-0 (2005).
Ionescu, Mihail, "Chemistry and Technology of Polyols for Polyurethanes", 2nd edition, vol. 1, Smithers Rapra Technology Ltd. publishers, 392 pages (2016).
Goethals, Telechelic Polymers: Synthesis and Applications, CRC Press, pp. 197-209 (1989).
Middleton et al., Stirred-Tank and Loop Reactors, Wiley-VCH Verlag Gmbh & Co. KGaA, Weinheim; 14 pps. (2005).
Hum, Christina et al., "Polyether Plant Design", Senior Design Report by the University of Pennsylvania, pp. 1-256 (Apr. 2017).
Ionescu, Mihail, "Chemistry and Technology of Polyols for Polyurethanes 2nd Edition", pp. 128-138 (2016).
BUSS ChemTech brochure for participants at the Graz Ethylene Oxide Converter Conference of Jun. 29, 2006, 26 pages.
Goethals, Eric J., Telechelic Polymers: Synthesis and Applications, Chapter 9, Polyols for Polyurethane Production (1989).
Duveen, Von R.F et al., The BUSS Loop Reactor ("LR") in the Oil and Fat Hardening Industry (Fette, Seifen, Anstrichmittel), 84(1), pp. 511-515 (1982).
Van Dierendonck, Laurent L., et al., "Loop Venturi Reactor—A Feasible Alternative to Stirred Tank Reactors?", Ind. Eng. Chem. Res., 37: pp. 734-738 (1998).
Petrochemical's 3EAO alkoxylation plant in Yeosu, South Korea (2006).
The EU-sponsored project LIFE98 ENV/F/000300, "Improved alcoxylation process" (1999).
Mihail Ionescu "Chemistry and Technology of Polyols for Polyurethanes", published in 2005 by Rapra Technology Limited, pp. 121-122.†
Joana Kettner "Kinetic investigation of different supported catalysts for the polymerization of propylene under industrially relevant conditions", publication date: May 14, 2019, pp. 9-10.†
Wiley-VCH Verlag Gmbh & Co. KGaA, "Stirred-Tank and Loop Reactors" 2005.†
Goethals, Ph.D., Eric J., "Telechelic Polymers: Synthesis and Applications," CRC Press, CRC Revivals 1989 (reissued 2018).†
Buss brochure (published 2017, author unknown).†
LyondellBasell brochure (published 2015, author unknown).†
Mihail Ionescu, Chemistry and Technology of Polyurethanes vol. 1 2nd Ed., p. 128-131, 134, 2016, Smithers Rapra, UK.†
Ullmann's Encyclopedia of Industrial Chemistry vol. B4, 5th Ed., p. 172-173, 1992, Weinheim, Germany.†
Handout distributed at "Ethylene Oxide Converter Conference", Graz (Austria), p. 1-26, 2016.†
Participant list of Graz Ethylene Oxide Converter Conference 2006, D4.†

(56) References Cited

OTHER PUBLICATIONS

Eric Goethals, Techelic Polymers, Synthesis and Applications, p. 197,198,203, 1989, CRC Press, USA.†

\* cited by examiner
† cited by third party

PROCESS FOR THE PRODUCTION OF ALKOXYLATES

CROSS REFERENCE TO RELATED APPLICATIONS

This application is a U.S. National Stage Entry of International Patent Application Serial Number PCT/EP2020/070083, filed Jul. 16, 2020, which claims priority to European Patent Application No. EP 19 186 525.2, filed Jul. 16, 2019, the entire contents of both of which are incorporated herein by reference.

FIELD

The present disclosure generally relates to alkoxylates, including processes for producing alkoxylates.

BACKGROUND

In batch production of alkoxylates (including polyether polyols) the 'growth ratio' is defined as the final batch volume (comprising adducts produced by the reaction of one or more starting materials with one or more alkylene oxides) divided by the minimum possible volume of starting material, before addition of any alkylene oxide.

For any given final reaction volume (batch size), the maximum growth ratio achievable therefore depends on the minimum volume of starting material which can be handled. For any given reactor, a small minimum starting volume is desirable as it facilitates production of high growth ratio products.

Typically, a reactor set-up for performing alkoxylation reactions comprises one or more reaction vessels to contain the reactants and provide residence time for the reaction to proceed to completion, one or more mixing devices to intimately contact the reactants with one another, and one or more heat exchanging devices to remove the heat of reaction.

An advanced reactor system (a so-called jet loop reactor) combines mixing and heat removal functions in one or more external circulation loops wherein fluid from the reaction vessel is conveyed to a pump which provides motive force to circulate said fluid through a heat exchange device to remove heat, through a jet mixer which induces a gas flow from the reaction vessel headspace into intimate contact with the circulating fluid, and back to the reaction vessel. In general at least one pump, at least one heat exchanger, and at least one jet mixer will be provided for each reaction vessel. The major advantages of the jet loop reactor over less-advanced reactor systems include more intensive mixing of gas and liquid phases and hence better mass and heat transfer which enables faster reaction times and better cooling; forced circulation and continual remixing of the reactor gas phase with the reactor liquid phase, which minimizes accumulation of unreacted alkylene oxide in the reactor head-space and thereby improving reactor safety and product quality; and the ability to install a much larger heat transfer area than is possible by the direct attachment of cooling coils to the reactor shell alone. In some cases, a mechanical agitator is installed inside the vessel to supplement the action of the jet mixer.

In general, the minimum starting volume is governed by the pump suction requirements, and the volume of the external circulation loop including the pump, heat exchanger, jet mixer, and associated pipework. In particular, the starting volume must be sufficient to fill the external loop such that the pump suction is continually supplied with recirculating liquid. This limitation is typical of reactors, which rely on external cooling loops to supply or remove heat of reaction. In the case of reactors without an external cooling loop, the minimum starting volume may instead be governed by the ability to effectively cool and agitate material in the bottom of the reactor vessel.

Typical jet loop reactors with a single external liquid circulation loop are capable of achieving growth ratios in the range of about 1:10 to 1:20.

High molecular weight alkoxylates such as polyethylene glycols (PEG's) methoxypolyoxyalkylene glycols (MPEG's) and polypropylene glycols (PPG's) as well as many polyether polyols and other polyoxyalkylene glycol products require a growth ratio well in excess of that achievable in a typical jet loop reactor or stirred tank reactor. There are several techniques for achieving higher growth ratios, which are both well known in the art and practiced in industry, as follows:

A volume of 'pre-polymer' of lower than final target molecular weight may be first produced by reaction of the one or more starting materials and one or more monomeric educts in the reactor, a fraction thereof withdrawn, and the remaining fraction subsequently returned to the same reactor for addition of one or more further monomeric educts in sufficient quantity to achieve the final target molecular weight. This approach suffers several drawbacks: A larger volume of pre-polymer must be prepared than is required for a single final batch. Therefore, excess pre-polymer must be stripped free of residual oxide, cooled, and stored for later use. This significantly increases the batch time, and requires external storage capacity. The possibility is introduced of thermal or oxidative degradation of the pre-polymer during storage.

In the case of a jet loop reactor (or other type of reactor fitted with external cooling loop), one or more secondary external circulation loops comprising pump, heat exchanger, jet mixer and associated piping may be installed in addition to a primary loop. At least one of the secondary loops is small in comparison with the primary loop (with a correspondingly small starting volume). Reaction is commenced on a small secondary loop until sufficient volume is available to enable the large primary loop to be commissioned. This is sometimes referred to as 'dual loop' operation. Dual loop operation can achieve a maximum growth ratio up to 60 or even higher, but suffers several drawbacks.

During initial operation on the secondary loop, the primary loop is idle (no liquid circulation and no cooling). Therefore, any leakage of monomeric educt (especially in the case of ethylene oxide) into the large loop would be very hazardous due to the potential for self-reaction with the possibility of local overheating and consequent decomposition.

Potential leakage of alkylene oxide into the idle large loop may also promote formation of low molecular weight oligomers (such as 1.4-dioxane and dioxalane) which are highly deleterious to product quality.

In the case of dual loop operation in order to positively segregate the primary loop from the secondary loop during initial operation on the small loop only, it is practiced in the industry to install high integrity isolation valves on one or more of the external loops (and optionally to maintain a high-pressure nitrogen buffer between said isolation valves). These valves are very expensive due to the size of the large loop piping (which may be up to 450 mm diameter or even larger) and the system design pressure (which may as high 45 barg or even higher). In addition, the additional pipes, valves and actuators lead to a very congested layout around the reactor.

The batch time is considerably extended when operating in dual loop mode, since initial operation on the secondary small loop is very slow compared with the main loop due to the much reduced circulation, mixing and cooling rate. EP 2 285 867 B1 describes a continuous process for preparing polyether polyols using a first reactor comprising a first continuous flow loop and a second reactor comprising a second continuous flow loop, wherein both reactors each comprise a pump operable to pump a reaction stream through the respective continuous flow loop. The second reactor may comprise a product inlet in fluid communication with the product outlet of the first reactor and at least a portion of the first reaction stream containing a first reaction product is conveyed from the first flow loop to the second flow loop. In this process known from the prior art, however, both reactors comprising continuous flow loops each exhibit the same reactor size. There is no hint in this document, to provide two consecutive reactors connected to each other, wherein a first reactor has a smaller volume than a second main reactor. Moreover, EP 2 285 867 B1 teaches a continuous process rather than a batch process and is restricted to use with di-metal cyanide (DMC) catalysts. The first reaction loop in this document has not the meaning of a pre-treatment vessel but more that of a stage in a multistage reactor like a CSTR cascade.

Thus a need exists to provide an improved process for the production of alkoxylates according to the above definition with a high growth ratio.

DETAILED DESCRIPTION

Figure 1:
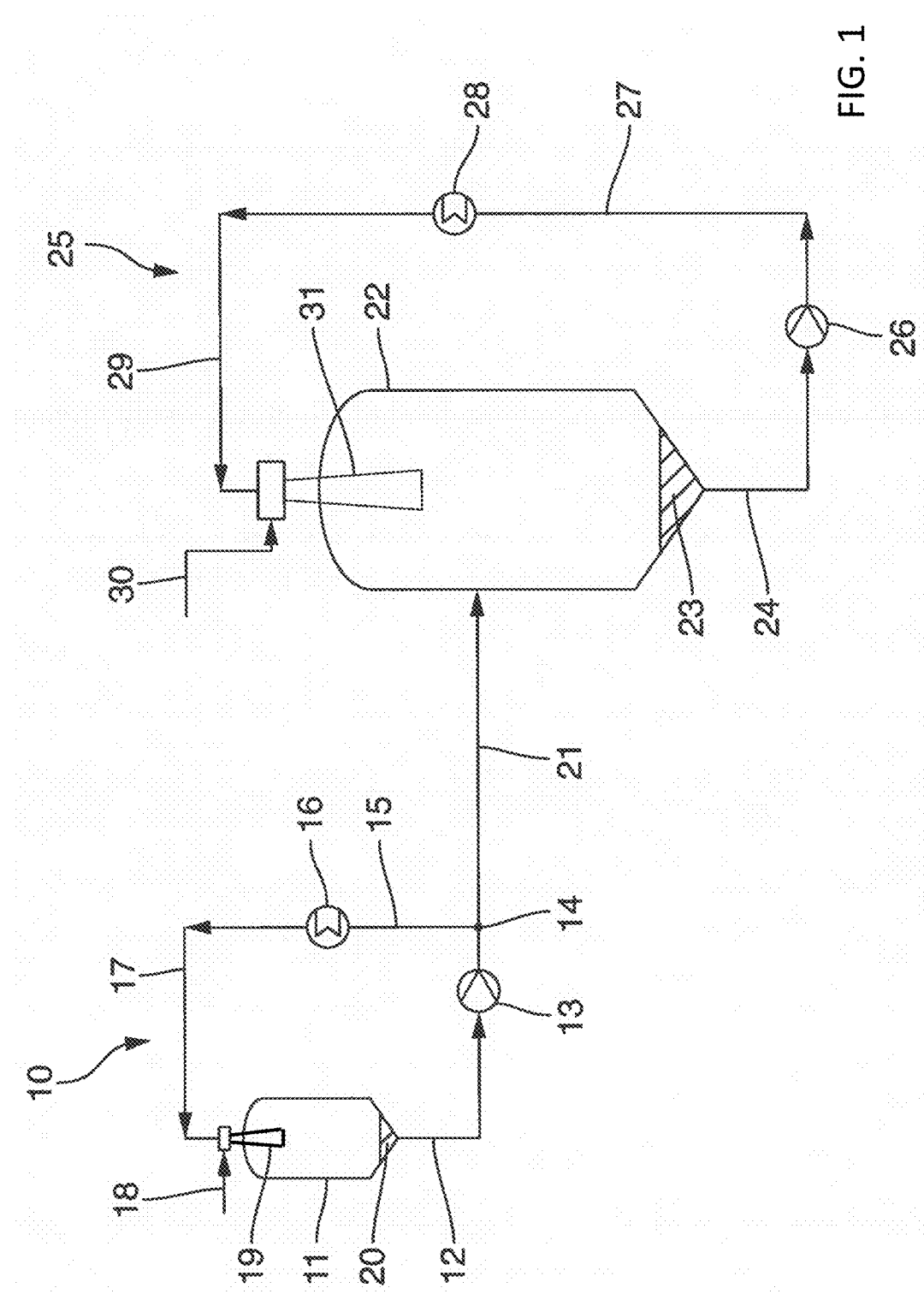
FIG. 1 is a simplified schematic view of an exemplary plant comprising a smaller and a larger jet loop reactor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a process for the production of adducts resulting from the reaction of at least one starting material which contains at least one active or labile hydrogen atom with at least one monomeric educt such as an alkylene oxide, usually in the presence of a catalyst, in at least one first reactor and thereafter passing the product of the first reactor to at least one second reactor for further reaction. In cases where the monomeric educt is a member of the class of alkylene oxides, the resulting adducts are known as alkoxylates and the reaction process is known as alkoxylation.

According to the present invention the first reactor, provided with a first circulation loop, comprises a smaller volume than the second reactor, provided with a second circulation loop and in the first reactor a pre-polymer is produced which thereafter is passed to the second reactor, wherein the desired polymer is produced, and wherein at least one of the first or the second reactor is a jet loop reactor.

A different combination of reactors wherein at least one of said combination of reactors is not a jet loop reactor does not capture the advantages of jet reactor technology (in particular the forced circulation of both liquid and gas phases wherein the jet mixer continually extracts gas from the reactor headspace and remixes said gas with the circulating liquid), and therefore cannot achieve the high mass transfer rates, high product quality and shorter batch times which are obtainable with jet reactor technology described herein.

The solution of the present invention is based on the general consideration that principally a technique would be possible whereby a volume of pre-polymer is produced in a first reactor (or pre-reactor) of sufficient final batch volume to satisfy the starting volume of a second (or main) reactor. The starting volume of the pre-reactor is smaller than that of the main reactor. After completion of pre-reaction in the first reactor, the full volume of pre-polymer is transferred to the second reactor wherein further reaction takes place to produce a final polymer of the desired molecular weight. The combination of pre-reactor and main reactor can achieve a growth ratio of up to 1:100 or even greater; can avoid the need to store pre-polymer externally; and by splitting the overall reaction into concurrent production of pre-polymer in the first or pre-reactor with production of final polymer in the second or main reactor a very considerable reduction in overall batch time (and increase in system productivity) is possible.

The first reactor according to the present invention may optionally carry out various pretreatment steps prior to pre-reaction, including but not limited to heating, catalysis, drying, and mixing of the starting material.

According to the present invention, at least one of the first or the second reactor is a jet loop reactor. Preferably, at least the second larger reactor is a jet loop reactor.

Most preferably not only the larger reactor in the second circulation loop is a jet loop reactor, but also the smaller reactor in the first circulation loop, wherein the pre-polymer is prepared, is a jet loop reactor. This kind of process wherein two or more batch reactors of which at least one is a jet loop reactor, and wherein each jet loop reactor contains at least one jet mixer in a circulation loop, makes it possible to achieve higher growth ratios than prior art techniques heretofore disclosed.

Another embodiment of the present invention may be preferred in cases where the starting material is highly viscous, or comprises a mixture of starting materials one or more of which is solid at ambient temperature or highly viscous under reaction conditions, such as but not limited to molten sorbitol, or mixtures of sucrose and/or sorbitol with glycerol alone or in admixtures with other liquid starting materials. Such mixtures may initially be difficult to pump through an external circulation loop due to high solids content and/or high viscosity, until sufficient alkylene oxide has reacted to reduce the solids content and/or viscosity and thereby render the reaction mixture susceptible to pumping. Therefore, the first, smaller reactor may optionally be fitted with a stirrer either in place of, or preferably in addition to the jet mixer such that the initial reaction mass may be effectively mixed and reaction heat removed by internal or external heat transfer coils attached to the reactor vessel until such time as the external loop may be placed in service.

According to an alternative embodiment of the invention the first smaller reactor, wherein the pre-polymer is prepared, can be installed instead of, or in addition to a pre-treatment vessel. Such a combination of a separate pre-treatment vessel, plus a separate pre-reactor to produce pre-polymer, plus a main reactor to produce final polymer requires somewhat higher investment, but also can provide more flexibility and a further reduction in batch times.

The invention extends the concept of a stirred tank pre-reactor to a jet reactor process scheme for production of high growth ratio alkoxylates and polyether polyols.

According to a preferred embodiment of the present invention the at least one second reactor comprises a volume, which is more than twice, preferably at least four times the volume of the at least one first smaller reactor.

According to a more preferred embodiment of the present invention the at least one second reactor comprises a volume, which is at least six times, preferably at least eight times the volume of the at least one first smaller reactor.

According to a still more preferred embodiment of the present invention the at least one second reactor comprises a volume, which is at least nine times, preferably about ten times the volume of the at least one first smaller reactor.

Whereas in conventional technology for the production of alkoxylates with a dual loop design wherein a separate pre-treatment vessel is used for heating, catalysis, drying and mixing of one or more starting materials, said pre-treatment vessel is usually of about the same size as the main reactor, whereas according to the present invention the first smaller reactor in which pre-treatment operations may optionally be carried out is preferably much smaller than prior art pre-treatment vessels.

According to a preferred embodiment of the present invention the reaction in the first smaller reactor is started with a minimum starting volume of the starting material corresponding to between a fifth volume part and a twentieth volume part, preferably corresponding to between an eighth volume part and a twelfth volume part, more preferably between a ninth and an eleventh part of the total volume of pre-polymer produced in the first smaller reactor.

The general concept of the present invention is to first react a smaller volume of a starting material with a fraction only of one or more than one alkylene oxide in a first smaller reactor integrated into a first circulation loop in the presence of a catalyst and to recycle the reaction mixture in said circulation loop until all of the provided alkylene oxide has reacted, thereby preparing a pre-polymer and thereafter transferring said pre-polymer through at least one line to the second larger reactor integrated into a second circulation loop. Said second larger reactor serves as a main reactor in the overall process. Thus the (remaining) main part of said one or more than one alkylene oxide is added to the second larger reactor integrated into the second circulation loop and is reacted with the pre-polymer within the second larger reactor in order to prepare the desired final polymeric product.

According to a preferred embodiment of the present invention the main part of the volume of pre-polymer produced in the first smaller reactor, preferably essentially the whole volume of pre-polymer produced in the first smaller reactor thereafter is transferred to the second reactor.

According to a preferred embodiment of the present invention the volume of the pre-polymer produced in the first smaller reactor is between an eighth volume part and a twelfth volume part, preferably between a ninth volume part and an eleventh volume part of the total volume of the final polymer produced in the second larger reactor.

According to a preferred embodiment of the present invention one or more than one monomeric educt is reacted in the first smaller reactor and one or more than one monomeric educt is reacted in the second larger reactor, wherein the total volume of educts reacted in the first smaller reactor is between an eighth weight part and a twelfth weight part, preferably between a ninth weight part and an eleventh volume part of the total volume of educts reacted in the second larger reactor.

According to a preferred embodiment of the present invention in the first smaller reactor, at least the following process steps are carried out:

Pre-heating and mixing of the one or more starting materials; adding the catalyst or mixture of catalysts; drying to remove moisture; heating to reaction temperature; adding one or more than one monomeric educt; obtaining a pre-polymer; and thereafter transferring the obtained pre-polymer is to the second larger reactor. It is understood that where more than one starting material is used, catalyst addition may be carried out after one or more than one of such starting materials have been charged.

One advantage of the process according to the present invention is that higher growth ratios can be achieved compared to conventional processes known from the prior art. Preferably the growth ratio defined as the final batch volume divided by the minimum initial volume of starting material according to the present invention is at least 80:1, preferably at least 90:1, more preferably at least 100:1.

According to a preferred embodiment of the present invention typical starting materials used to prepare the pre-polymer in the smaller first reactor are one or more than one selected from groups of compounds containing at least one labile or active hydrogen such as, but not limited to alcohols, acids, esters, diols, triols, polyols, amines, amides, monosaccharides, disaccharides and polysaccharides, in particular at least one selected from the group comprising methanol, glycerol, monoethylene glycol, diethylene glycol, monopropylene glycol, dipropylene glycol, trimethylolpropane, ethylene diamine, toluene diamine, sorbitol, mannitol, pentaerythritol, di-pentaerythritol and sucrose.

According to a preferred embodiment of the present invention, the one or more monomeric educts comprise one or more substances drawn from the class of cyclic ethers such as one or more alkylene oxides, in particular one or more of ethylene oxide, propylene oxide, butylene oxide and tetrahydrofuran.

According to another embodiment of the present invention the one or more monomeric raw materials may be dosed to the reaction mass continuously, intermittently, individually, simultaneously in any ratio, consecutively, or in combination thereof.

The process of the present invention in general is applicable to polymerization processes, which produce a broad range of different types of alkoxylates, wherein the process comprises the reaction of at least one alkylene oxide with a suitable starting material, i.e. a compound, more particularly with at least one compound mentioned in the above list as starting material. According to a preferred embodiment of the present invention, the polymeric product is a polyether polyol.

Usually the reaction is carried out in the presence of at least one suitable catalyst, which may be for instance an alkaline catalyst as for example an inorganic hydroxide compound as KOH, NaOH or the like.

Optionally, and particularly in cases where drying may be impractical due to volatility of the starting material or it is otherwise advantageous to exclude to the maximum practicable extent water such as in the production of methoxy-polyoxyalkylene glycols (so-called MPEGs) a solid (anhydrous) alkali metal alkoxide or alkaline earth metal alkoxide may be used as a catalyst for example sodium methoxide or potassium methoxide. In the case of amine starters which are to an extent self-catalytic the reaction may be started without adding a separate catalyst, but a separate catalyst may optionally be subsequently added during the reaction either in the pre-reactor or large main reactor. It is also an embodiment of the current invention that additional catalyst may optionally be added to the second reaction vessel.

Subject-matter of the present invention further is a plant particularly for carrying out a process for the production of alkoxylates according to the description above, comprising at least one first smaller pre-reactor equipped with a first circulation loop comprising at least a circulation pump and a heat exchange device and at least one second main reactor equipped with a circulation loop comprising at least a circulation pump and a heat exchange device connected in a way that the content of the first smaller reactor can be transferred to the second larger reactor and wherein at least one circulation loop comprises a jet injector nozzle.

Advantages result from the fact that at least one jet loop reactor is used, even in the first circulation loop, because jet loop reactors are capable to achieve high mass transfer rates. Such a jet loop generally comprises at least one reactor, integrated into a circulation loop, at least one jet device to inject the reaction medium and/or at least one monomeric compound into said reactor, at least one pump to convey the reaction medium within said circulation loop and optionally at least one cooling device, particularly at least one heat exchanger within said circulation loop in order to cool the reaction medium before it is recycled into the reactor.

According to a preferred embodiment of the present invention, the plant comprises at least one line starting at a branch of the first circulation loop downstream of said pump and upstream of said heater/cooler of said first circulation loop, which connects said first circulation loop with said second larger reactor in said main circulation loop.

According to a preferred embodiment of the present invention the main reactor in said second circulation loop is a jet loop reactor, which means at least one reactor within each of the two circulation loops of the plant is a reactor of the jet loop reactor type, comprising at least one jet device to inject the reaction medium and/or the at least one monomeric educt into the first and into the second reactor, respectively, preferably said second main circulation loop comprising at least one jet loop reactor, at least one pump and at least one heater/cooler in the second circulation loop. Most preferably, both reactors, namely the smaller first reactor in the first circulation loop as well as the larger second reactor in the second circulation loop, are jet loop reactors, respectively.

In the following referring to FIG. 1 a preferred embodiment of the present invention is illustrated. The drawing is simplified showing only those main components of the plant which are of interest for the comprehension of the present invention. The plant comprises a first smaller reactor 11 which serves to prepare a pre-polymer and which is equipped with a first circulation loop 10. Said first circulation loop 10 comprises a first smaller reactor 11, an output line 12 starting from the bottom of the first smaller reactor 11 for conveying a reaction mixture within the first circulation loop 10 by means of a pump 13. The pump 13 conveys the reaction mixture within the first circulation loop 10 which comprises a branch connection 14 from which a first line 15 leads to a heat exchanger/cooler 16 designated to cool the reaction mixture which is recycled within the first circulation loop via output line 12, pump 13, line 15, heat exchanger/cooler 16 and line 17 back to the top of the first smaller reactor 11.

Thus as long as the branch connection 14 is open to line 15 the reaction mixture is recycled within a closed first circulation loop 10, which is the case in a first reaction phase, wherein the pre-polymer is prepared. A small volume of a starting material 20 of for example about 0.5 m$^3$ is provided at the beginning of the reaction in the first smaller reactor 11, which may be for instance about a tenth part of the total volume of the first smaller reactor 11. Thereafter one or more than one monomeric educts are added via line 18 and the pre-polymer is prepared within the first smaller reactor 11. Said first smaller reactor 11 preferably is a jet loop reactor comprising an injection device 19 with a jet nozzle and designed to inject the monomeric educt and the circulation reaction mixture flowing in line 17 into the first smaller reactor 11. A first reaction phase comprises preheating the starting material 20 (initiator), adding the catalyst, drying, heating to reaction temperature, adding successively the designated calculated amount of one or more than one monomeric educts via line 18, and circulating the reaction mixture within the first circulation loop 10 until all monomeric educts have reacted with the pre-polymer. Thereafter the branch connection 14 to line 15 is closed and an alternative line 21 is opened by which preferably the whole amount of the obtained pre-polymer is transferred to a second larger reactor 22 which is equipped with a second circulation loop 25 and which can be considered as the main reactor in the process according to the present invention. Within said second circulation loop 25, the pre-polymer obtained in the first circulation loop 10 as described above is reacted to the final designated polymer. The volume of the second larger reactor 22 may be for instance about ten times as large as the volume of the first smaller reactor 11. Thus for example a volume of about 5 m$^3$ of pre-polymer prepared in the smaller first circulation loop 10 may be transferred via line 21 to the second larger reactor 22, which may have a total reactor volume of for example about 50 m$^3$.

The second larger reactor 22 wherein the pre-polymer 23 is provided which has been prepared before in the first smaller reactor 11 is equipped with the second circulation loop 25. The second circulation loop 25 further comprises a line 24 starting from the bottom of the second larger reactor 22, a pump 26 in said line for conveying the reaction mixture within the second circulation loop 25 via line 27 through a heat exchanger/cooler 28 for cooling the reaction mixture which is then recycled via line 29 to the top of the second larger reactor 22.

A further amount of one or more monomeric educts is added successively via line 30 to a second injection device 31 comprising a jet nozzle and a mixing device for mixing the reaction mixture flowing within line 29 and the monomeric compound added via line 30 and injecting said mixture in the top region into the second larger reactor 22. Thus, the second circulation loop 25 as well is a jet circulation loop with thorough mixing of reaction components and injecting them via a jet nozzle preferably at high speed and in a finely dispersed manner into the second larger reactor 22. Within the second circulation loop 25 the reaction mixture is recycled until the whole provided volume of pre-polymer 23 has been reacted with the added monomeric compound or compounds to the designated polymeric compound with a specific molecular weight. The reaction is completed after the whole amount of one or more than one monomeric educts have been added via line 30. Here it is to mention that these one or more than one educts may be the same as have been used before for the production of the pre-polymer in the first circulation loop. This, however, is not mandatory as alternatively different monomeric educts may be added in the reaction phase executed in the second larger circulation loop.

Figure 2:
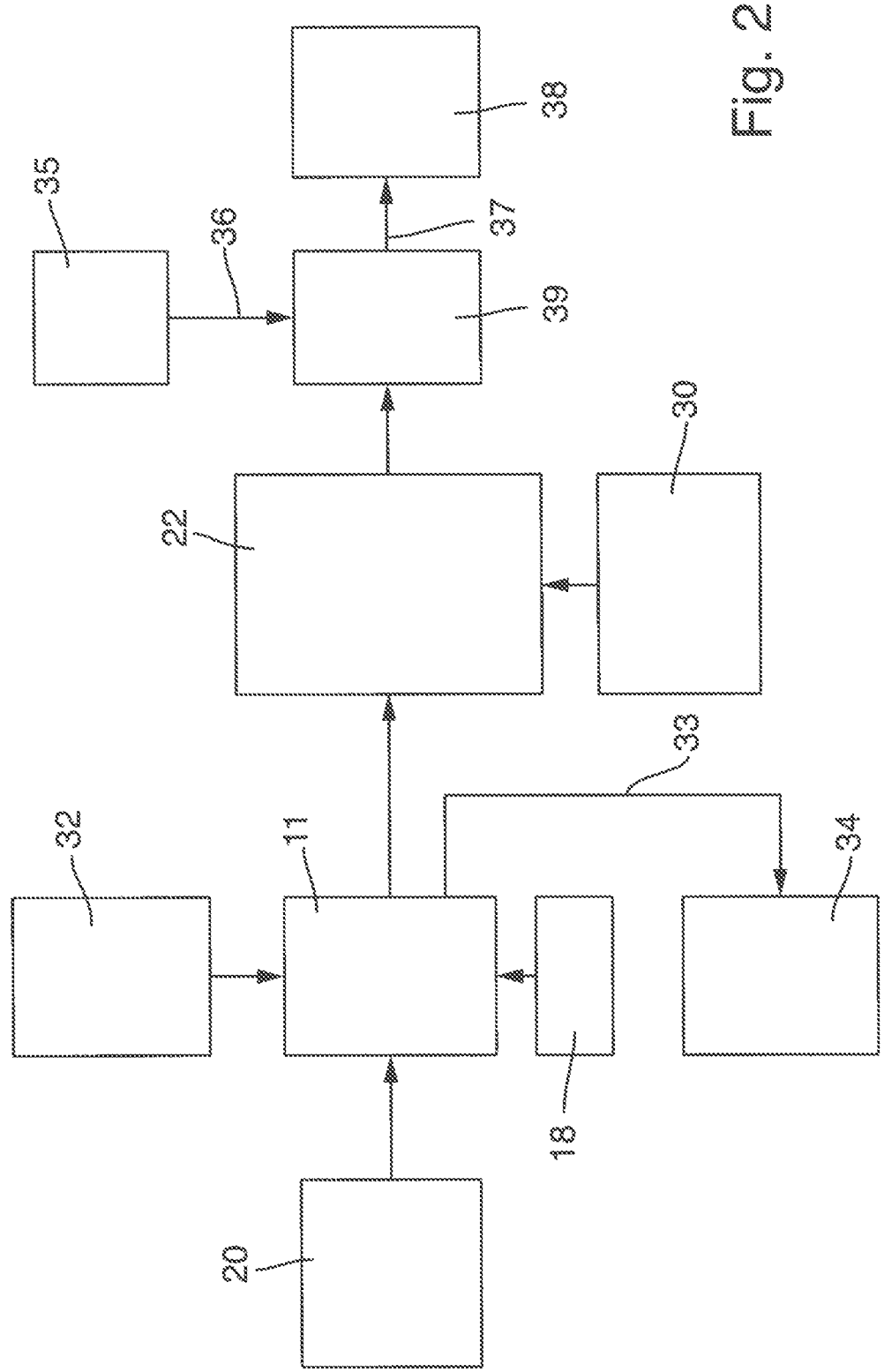
FIG. 2 is a block diagram showing an example mass balance.

In the following referring to the block diagram of FIG. 2, an exemplary embodiment of the present invention is illustrated in further detail. The block diagram is simplified and only shows the main mass streams being of interest for the understanding of the process according to the present invention. For instance, about 700 kg/batch of glycerol is used as the starting material 20 in the first step of the process wherein a pre-polymer is prepared within the first smaller reactor 11. To the glycerol, for example about 90 kg/batch KOH dissolved in 90 kg/batch of water is added as the catalyst 32. The starting material is now dried and water as waste from vacuum drying is discharged via line 33 to a collecting device 34. For example about 4300 kg/batch of propylene oxide is added as monomeric raw material to the first smaller reactor 11 in the smaller first circulation loop 10.

About 5000 kg/batch of pre-polymer produced in the smaller first reactor 11 is passed to the second larger reactor 22. An amount of 6700 kg/batch of ethylene oxide and 33000 kg/batch of propylene oxide is added to the second larger reactor 22 as further monomeric educt compounds. By reacting these further amounts of monomeric educts with the pre-polymer in the second larger reactor 22 for example about 45000 kg/batch of a polyol product is produced in the second larger reactor. This polyol product may be subjected to a post-treatment reactor 39 with a neutralization agent 35 added via line 36 to the post-treatment reactor 39. Thereafter about 45000 kg/batch of a final polyol product may be conveyed via line 37 to a filtration device 38, wherein the polyol product is purified.

LIST OF REFERENCE NUMBERS 10 first circulation loop
11 first smaller reactor
12 output line
13 pump
14 branch connection
15 line
16 heat exchanger/cooler
17 line
18 line
19 injection device
20 starting material
21 alternative line
22 second larger reactor
23 pre-polymer
24 line
25 second circulation loop
26 pump
27 line
28 heat exchanger/cooler
29 line
30 line
31 injection device
32 catalyst
33 line
34 collecting device
35 neutralization agent
36 line
37 line
38 filtration device
39 post-treatment reactor

What is claimed is:

1. A process for producing an alkoxylate polymer comprising:
    reacting a monomeric educt in the presence of an alkaline catalyst and a starting material in a first reactor with a first circulation loop to produce at least a pre-polymer; and
    passing the pre-polymer from the first reactor to a second reactor with a second circulation loop to produce the alkoxylate polymer, wherein the first reactor comprises a volume that is smaller than a volume of the second reactor,
    wherein the second reactor is a jet loop reactor including a jet device configured to inject reaction medium and the monomeric educt into the second reactor,
    wherein a growth ratio defined as a final batch volume of the second reactor divided by an initial volume of the starting material in the first reactor is at least 80:1;
    wherein the volume of the first reactor is less than 10 m$^3$.

2. The process of claim 1 wherein the volume of the second reactor is more than twice the volume of the first reactor.

3. The process of claim 1 wherein the volume of the second reactor is more than six times the volume of the first reactor.

4. The process of claim 1 wherein the volume of the second reactor is more than nine times the volume of the first reactor.

5. The process of claim 1 wherein a reaction in the first reactor is started with the initial volume of the starting material in the first reactor corresponding to between one fifth volume part and one twentieth volume part of a total volume of pre-polymer produced in the first reactor.

6. The process of claim 1 wherein a majority of a volume of the pre-polymer produced in the first reactor is transferred to the second reactor.

7. The process of claim 1 wherein a volume of the pre-polymer produced in the first reactor is between one eighth volume part and one twelfth volume part of a total volume of the alkoxylate polymer produced in the second reactor.

8. The process of claim 1 comprising reacting the monomeric educt in the second reactor, wherein a total mass of educt reacted in the first reactor is between one eighth mass part and one twelfth mass part of a total mass of educt reacted in the second reactor.

9. The process of claim 1 comprising in the first reactor:
    preheating and mixing the starting material;
    adding the catalyst;
    drying;
    heating to a reaction temperature;
    adding the monomeric educt; and
    obtaining the pre-polymer.

10. The process of claim 1 wherein the growth ratio defined as the final batch volume of the second reactor divided by the initial volume of the starting material in the first reactor is at least 100:1.

11. The process of claim 1 wherein the starting material is selected from the group consisting of alcohols, acids, esters, diols, triols, polyols, amines, amides, monosaccharides, disaccharides, and polysaccharides.

12. The process of claim 1 wherein the monomeric educt is selected from a class of cyclic ethers that includes but is not limited to alkylene oxides.

13. The process of claim 1 comprising dosing the monomeric educt to a reaction mass in the first reactor continuously, intermittently, individually, simultaneously in any ratio, consecutively, or in combination thereof.

14. The process of claim 1 wherein the alkoxylate polymer is a polyether polyol or a polyethylene glycol or a polypropylene glycol or a methoxypolyethylene glycol.

15. The process of claim 1 wherein both the first reactor and the second reactor are jet loop reactors.

16. A process for producing an alkoxylate polymer comprising:
reacting a monomeric educt in the presence of a catalyst and a starting material in a first reactor with a first circulation loop to produce at least a pre-polymer; and
passing the pre-polymer from the first reactor to a second reactor with a second circulation loop to produce the alkoxylate polymer, wherein the first reactor comprises a volume that is smaller than a volume of the second reactor,
wherein at least one of the first reactor or the second reactor is a jet loop reactor,
wherein a growth ratio defined as a final batch volume of the second reactor divided by an initial volume of the starting material in the first reactor is at least 80:1,
wherein a reaction in the first reactor is started with the initial volume of the starting material corresponding to between one fifth volume part and one twentieth volume part of a total volume of pre-polymer produced in the first reactor.

17. A plant for producing an alkoxylate polymer, the plant comprising:
a first reactor with a first circulation loop, wherein a volume of the first reactor is less than 10 m$^3$;
a second reactor with a second circulation loop, wherein the second reactor is larger in volume than the first reactor, and the second circulation loop is larger than the first circulation loop; and
at least one of:
a connection line between the first circulation loop and the second reactor, or
a connection line between the first circulation loop and the second circulation loop,
wherein the second circulation loop comprises a jet loop reactor, a pump, and a heater/cooler,
wherein the plant is configured to:
react a monomeric educt in the presence of an alkaline catalyst and a starting material in the first reactor with the first circulation loop to produce at least a pre-polymer; and
pass the pre-polymer from the first reactor to the second reactor with the second circulation loop to produce the alkoxylate polymer,
wherein a growth ratio defined as a final batch volume of the second reactor divided by an initial volume of the starting material in the first reactor is at least 80:1.

18. The plant of claim 17 wherein the first circulation loop comprises a jet loop reactor, a pump, and a heater/cooler.

19. The plant of claim 18 comprising a line starting at a branch connection of the first circulation loop downstream of the pump and upstream of the heater/cooler of the first circulation loop and connecting the first circulation loop with the second reactor in the second circulation loop.

* * * * *